US006456859B1

(12) United States Patent
Desblancs et al.

(10) Patent No.: US 6,456,859 B1
(45) Date of Patent: Sep. 24, 2002

(54) METHOD OF DELIVERING A TELEPHONE NUMBER ASSOCIATED WITH A TELEPHONE SUBSCRIPTION, AND TELEPHONE SETS AND MOBILE TELEPHONES IMPLEMENTING THE METHOD

(75) Inventors: Eric Desblancs; Brigitte Coz, both of Paris (FR)

(73) Assignee: Alcatel Radiotelephone, Paris (FR)

( * ) Notice: Subject to any disclaimer, the term of this patent is extended or adjusted under 35 U.S.C. 154(b) by 0 days.

(21) Appl. No.: 08/204,441

(22) Filed: Mar. 2, 1994

(30) Foreign Application Priority Data

Mar. 3, 1993 (FR) .............................................. 93 02470

(51) Int. Cl.$^7$ ................................................ H04B 1/38
(52) U.S. Cl. .................... 455/558; 455/550; 379/357.01
(58) Field of Search .............................. 379/58, 59, 61, 379/62, 357, 354, 357.01; 380/21; 455/33.1, 54.1, 422, 550, 558

(56) References Cited

U.S. PATENT DOCUMENTS

| | | | | |
|---|---|---|---|---|
| 5,020,091 A | * | 5/1991 | Krolopp et al. ................ | 379/58 |
| 5,134,717 A | * | 7/1992 | Rasmussen .................. | 379/354 |
| 5,222,127 A | * | 6/1993 | Fukui ........................... | 379/58 |
| 5,335,276 A | * | 8/1994 | Thompson et al. ............ | 380/21 |
| 5,339,353 A | * | 8/1994 | Asahara et al. ............... | 379/59 |
| 5,467,389 A | * | 11/1995 | Endo et al. ............. | 379/357 X |

FOREIGN PATENT DOCUMENTS

| | | | |
|---|---|---|---|
| DE | 3930869 A1 | 3/1991 | |
| EP | 369110 | * 5/1990 | |
| EP | 0526981 A2 | 2/1993 | |
| JP | 1-149649 | * 6/1989 | ................. 379/357 |
| WO | WO9112698 | 8/1991 | |
| WO | WO9219078 | 10/1992 | |

OTHER PUBLICATIONS

Motorola User Manual, Motorola Pan American Cellular Subscriber Group, 1993, p. 12.*
French Search Report FR 9302470.
Klaus Spindler, "The German Cellular Radio Telephone System C", IEEE Communications Magazine, vol. 24, no. 2, Feb. 1986, pp. 22–29.*
Karl Kammerlander, "Characteristic of the Cellular Mobile Radio System C450", telcom report, vol. 8, Jul./Aug. 1985, pp. 209–214.*
"Your Portable Connection", 1989 Motorola, Inc.*
Motorola Self–test mode operating instructions, pp. 1–4., Jun. 1983.*
"Sony Handportable to Form Mainstay of Cellnet Marketing," Newsbytes News Network., Oct. 1992.*
Sony CM–H333 manual, Sony Corp., p. 15., 1993.*
Nokia LX11C/LX11T brochure, pp. 2–4.*

* cited by examiner

Primary Examiner—Nay Maung
(74) Attorney, Agent, or Firm—Sughrue Mion, PLLC

(57) ABSTRACT

A method of delivering a telephone number associated with a telephone subscription to the user of a telephone set within the context of said subscription, use of said set requiring the user to provide subscription identification data stored in a data medium held by the owner of said subscription and co-operating with said telephone set. The telephone number is previously stored in the data medium and is transferred into the telephone set at the request of the user, to be delivered to the user of said set, in particular by displaying it on a screen. The invention is suitable for use in mobile telephony.

9 Claims, 1 Drawing Sheet

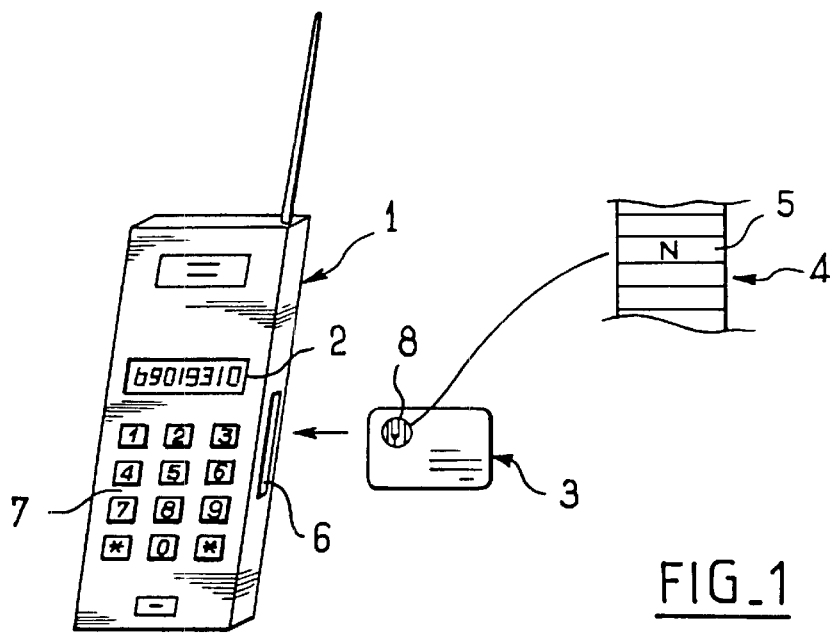
FIG_1
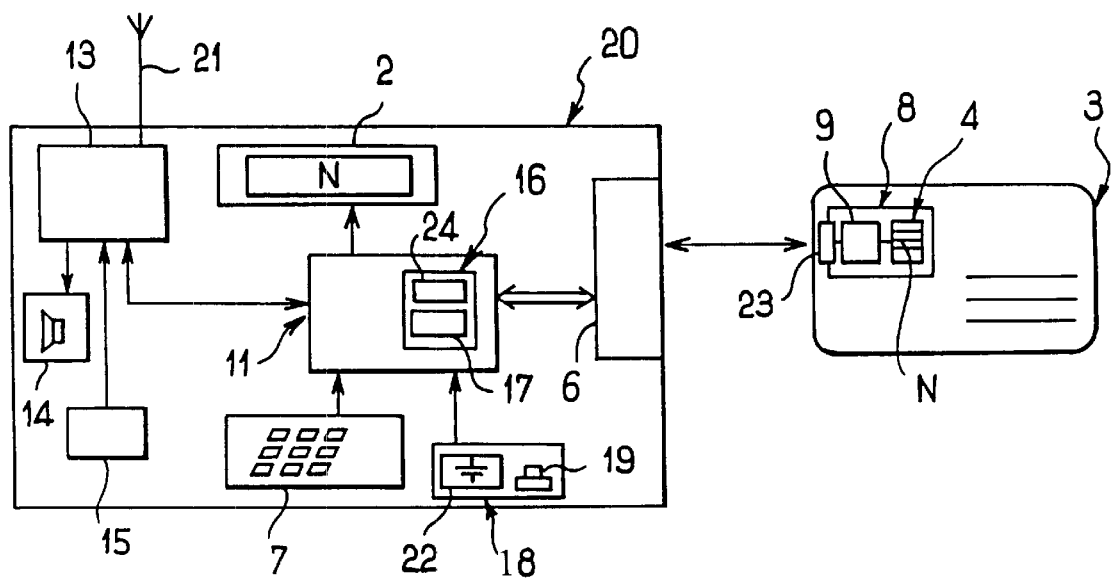
FIG_2

METHOD OF DELIVERING A TELEPHONE NUMBER ASSOCIATED WITH A TELEPHONE SUBSCRIPTION, AND TELEPHONE SETS AND MOBILE TELEPHONES IMPLEMENTING THE METHOD

FIELD OF THE INVENTION

The present invention relates to a method of delivering a telephone number associated with a telephone subscription.

It also relates to telephone sets, in particular mobile telephones that implement the method.

BACKGROUND OF THE INVENTION

All telephone users have at some time or another found themselves in the situation where they do not know or they have forgotten the number of the telephone they are using. The simple and usual way of solving this problem is to label a telephone with a telephone number. However, that solution takes it for granted that a given telephone set is capable of being associated with one telephone number. Unfortunately, that solution is not acceptable with mobile telephones e.g. of the kind operating in the context of the new pan-European mobile telephone standard known as GSM (Global Service for Mobile communication). Under such circumstances, the concept of "telephone number" is no longer directly associated with the equipment, but with the subscriber. All of the data relating to a subscriber is contained in a special module that is held by the subscriber. Within the GSM standard, the data relating to a subscriber is contained in a subscriber identity module (SIM) in the form of a smart card that the subscriber inserts into the mobile radiotelephone. This module is essential for making use of a radiotelephone, and it is issued to a subscriber when a subscription is taken out for a GSM mobile telephone network.

The data contained in the SIM module include directories of numbers, messages, a personal identification code number (PIN) that the subscriber must key in when initializing use of a mobile telephone, and subscriber identification data for use by the network. It should be observed that none of this identity data bears any relationship with the telephone number of the subscriber. The utility operating a fixed or mobile telephone network is capable of establishing the correspondence between a subscriber identification number and a telephone number by using data contained in data bases of the network that are not accessible to the user. Thus, at present, there is no way of identifying and supplying a radiotelephone with the telephone number of its user.

OBJECT AND SUMMARY OF THE INVENTION

The object of the present invention is to remedy the above drawback by proposing a method of delivering a telephone number associated with a telephone subscription to a user using a telephone set in the context of said subscription, use of said set requiring the user to provide said set with subscription identification data stored in a data medium held by the owner of said subscription and co-operating with said telephone equipment.

According to the method of the invention, the telephone number is previously stored in the data medium and is transferred into the telephone set at the request of the user, to be delivered to the user of said set.

Thus, the user of a telephone set can discover the telephone number of the subscription associated with said telephone set without it being necessary to label a telephone number on said set, thus making it possible for the set to be completely interchangeable and independent of any particular subscription, as is the case of a mobile telephone in a GSM network.

According to another aspect of the invention, there is provided a telephone set including control and processing means, display means, and interface means for co-operating with a data medium independent of said telephone set and including subscription identification data, the telephone set implementing the method of the invention, and wherein a memory location is provided within said data medium to receive the telephone number corresponding to said subscription, and wherein the control and processing means are organized to control transfer of said telephone number from the data medium into the telephone set and to display it via said display means.

BRIEF DESCRIPTION OF THE DRAWING

Other features and advantages of the invention appear from the following description given by way of non-limiting example with reference to the accompanying drawing, in which:

FIG. 1 is a simplified diagram of a mobile telephone provided with a memory card reader and implementing the method of the invention; and FIG. 2 is a block diagram showing the essential elements of the mobile telephone and of the card that are involved in implementing the method of the invention.

MORE DETAILED DESCRIPTION

A particular implementation of the method of the invention is now described with reference to FIGS. 1 and 2.

With reference to FIG. 1, and by way of non-limiting example, consideration is given to a mobile telephone 1 generally provided with a keypad, a display device 2, and a reader 6 suitable for receiving a memory card 3 or a microcontroller card, or more generally a "smart" card, said card including an integrated circuit 8 specifically containing a memory zone 4 Within the GSM standard, this smart card 3 is called a "subscriber identity module" (SIM) and its memory zone 4 holds data relating to the subscriber, and in particular directories of numbers. By way of example, the subscriber's own telephone number N may be stored in one of these directories, preferably in a zone where writing takes place irreversibly.

Within the GSM standard, the fundamental functions of an SIM card, or more generally of an SIM module, are to store data and to perform algorithms under secure conditions, and in particular an algorithm for authenticating the identity of the subscriber. The memory of an SIM card includes data fields, including an administrative data field and a card identification data field.

It should be observed that the mechanisms for interchanging data between the SIM card 3 and the mobile telephone 1 have already been standardized and are implemented within the control and processing systems fitted to mobile telephones. It is thus possible to write and read data in the memory space of the SIM card 3.

When a subscription is taken out, the telephone number N of the subscriber may be written in a predetermined memory location of the SIM card 3 by the utility, that is to say the undertaking or organization which administers a fixed or mobile telephone network.

With reference to FIG. 2, the mobile telephone comprises hardware architecture 20 based on a control and processor unit 11, e.g. a microcontroller or any other equivalent device. The architecture further comprises a smart card reader device 6, a keypad 7, a screen 2, a power supply module 18 that generally includes a battery 22 and switch-on means, e.g. an ON/OFF switch, and a transmitter/receiver unit 13 provided with an antenna 21 and associated with a loudspeaker 14 and a microphone 15. The smart card 3, and in the present case the SIM card, includes, within an integrated circuit 8: at least one memory space 4, a control and processor unit 11 for performing algorithms and controlling data interchanges, and an interface device 23 for interfacing the card reader 6 which is under the control of the control and processing unit 11. Such a card structure is well known to the person skilled in the art, and it is described, in particular, in French patent No. FR 2 266 222.

In addition, in the control software of the mobile telephone 1, it is also necessary for the management program 16 of the mobile telephone (generally installed in a read-only memory) to include an additional function 17 for number-reading purposes in order to cause the number to be read at the specified address in the memory of the SIM card 3 and to cause it to be displayed on the display device 2.

In a practical implementation of the method of the invention, when the mobile telephone 1, 20 is switched on by action on the ON/OFF button 19, the user must initially insert the SIM card 3 in the reader 6 provided for this purpose and use the keypad 7 to key in a personal identity number (PIN), as with an automatic teller machine (ATM) in a bank.

The "number-reading" function 17 may also be called at any moment by means of a menu 24 included in the management program 16 and of providing access to various functions associated with the SIM card. The user is then asked to select a function, in particular that of verifying the user's own telephone number. When that function has been selected, the telephone number is displayed on the screen 2.

After user identification has been completed, the "number-reading" function 17 can be called, whereupon the telephone number N is transferred from the chip 8 of the card 3 into the control and processing unit 11 of the telephone 1, and it is displayed on the display device 2, e.g. a liquid crystal screen.

Naturally, the invention is not limited to the examples described above and numerous variants may be applied to the above examples without going beyond the ambit of the invention. Thus, multiple ways of storing the telephone number within the data medium may be envisaged. Furthermore, the data medium may be implemented in numerous different ways of different technologies e.g. using magnetic or optical technologies. Furthermore, the method of the invention may be implemented by any type of telephone set, whether stationary or mobile, providing it is able to receive a data medium capable of containing a telephone number.

What is claimed is:

1. A method of delivering a telephone number associated with a telephone subscription to the user of a telephone set, use of said set requiring the user to provide subscription identification data stored in a data medium held by the owner of said subscription and co-operating with said telephone set, wherein the telephone number is stored in the data medium, wherein the data medium is removably coupled to said telephone set, and wherein the telephone number only then is transferred from the coupled data medium into the telephone set at the request of the user, to be delivered to the user of said set, and wherein, after the telephone number has been transferred into the telephone set, it is displayed on display means provided in said telephone set.

2. A method according to claim 1, wherein, during a prior personalization sequence for the data medium, the telephone number is stored in said medium by the utility running the network from which the telephone set depends.

3. A method according to claim 1, in which use of the telephone set is subject to the user inputting a personal identification number, wherein the telephone number is transferred into the telephone set under the control of said set after the user has been identified and on the request of said user.

4. A method according to claim 1, wherein the user of the telephone set causes the transferred telephone number to be displayed.

5. The use of the method according to claim 1 in a mobile telephone network, in particular in compliance with the GSM standard.

6. The method according to claim 1, wherein telephone number is transferred only at the request of said user, and only after the data medium is coupled to the telephone set.

7. A telephone set for delivering a telephone number associated with a telephone subscription to a user of the telephone set within the context of said subscription, said telephone set comprising: control and process means; display means; and interface means for cooperating with a data medium independent of said telephone set and including subscription and identification data; wherein a memory location is provided within said data medium to receive a telephone number corresponding to said subscription, wherein said data medium is removably coupled to said telephone set, and wherein the control and processing means are organized to control, at the request of the user, transfer of said telephone number only from the coupled data medium into the telephone set, and to display said telephone number via said display means.

8. A telephone set according to claim 7, wherein the control and processing means are also organized, at any time during which the telephone set is in use, to cause the telephone number to be displayed in response to a request expressed by the user of said telephone set.

9. A mobile telephone according to claim 7, and implemented in a mobile communications network, in particular in a network in compliance with the GSM standard, in which the data medium is implemented in the form of a microcontroller card.

* * * * *